United States Patent
Repaske et al.

[11] Patent Number: 5,236,584
[45] Date of Patent: Aug. 17, 1993

[54] VACUUM FILTRATION APPARATUS

[75] Inventors: Roy Repaske, Kensington; Alan H. Rich, Eldersburg; Jimmie L. Slemp, Germantown, all of Md.

[73] Assignee: The United States of America as represented by the Department of Health and Human Services, Washington, D.C.

[21] Appl. No.: 755,959

[22] Filed: Sep. 6, 1991

[51] Int. Cl.⁵ .............................................. B01D 29/96
[52] U.S. Cl. .................................... 210/236; 210/451; 210/454; 210/467; 221/189
[58] Field of Search ............... 221/188, 189, 269, 303; 210/236, 241, 451, 454, 466, 467

[56] References Cited

U.S. PATENT DOCUMENTS

| | | | |
|---|---|---|---|
| 2,771,979 | 11/1956 | Lenhart | 221/269 |
| 3,160,587 | 12/1964 | Waring . | |
| 3,601,250 | 8/1971 | Merila | 221/188 |
| 4,225,440 | 9/1980 | Pitesky . | |
| 4,303,518 | 12/1981 | Grosshandler . | |
| 4,427,415 | 1/1984 | Cleveland . | |
| 4,468,322 | 8/1984 | Fogarty, Jr. et al. | 210/236 |
| 4,781,563 | 11/1988 | Capelle | 210/236 |
| 4,827,779 | 5/1989 | Marple et al. . | |
| 4,849,173 | 7/1989 | Chang . | |
| 4,850,840 | 7/1989 | Gneuss | 210/236 |
| 4,874,691 | 10/1989 | Chandler . | |
| 4,941,899 | 7/1990 | Liu . | |
| 4,997,561 | 3/1991 | Schutz . | |

FOREIGN PATENT DOCUMENTS 818960 8/1959 United Kingdom ............... 221/189

Primary Examiner—Robert A. Dawson
Assistant Examiner—W. L. Millard
Attorney, Agent, or Firm—Lowe, Price, LeBlanc & Becker

[57] ABSTRACT

A filtration apparatus provides for semiautomatic operation by including a filter element dispenser located at a filtration station. In order to effect removal of a used filter element from the filtration station, a tilting mechanism allows for tilting of a filtration stage which breaks or interrupts a vacuum which is otherwise continuously applied to the filtration station. In operation, the filter dispenser is manually rotated about a support to dispense a filter element in a filtration port at the filtration station. Next, a filtration cup which includes a filtration well is manually rotated about the support and positioned to be seated in the filtration port. After the filtration cup is seated in the filtration port a liquid to be filtered can be dispensed into the filtration well.

19 Claims, 3 Drawing Sheets

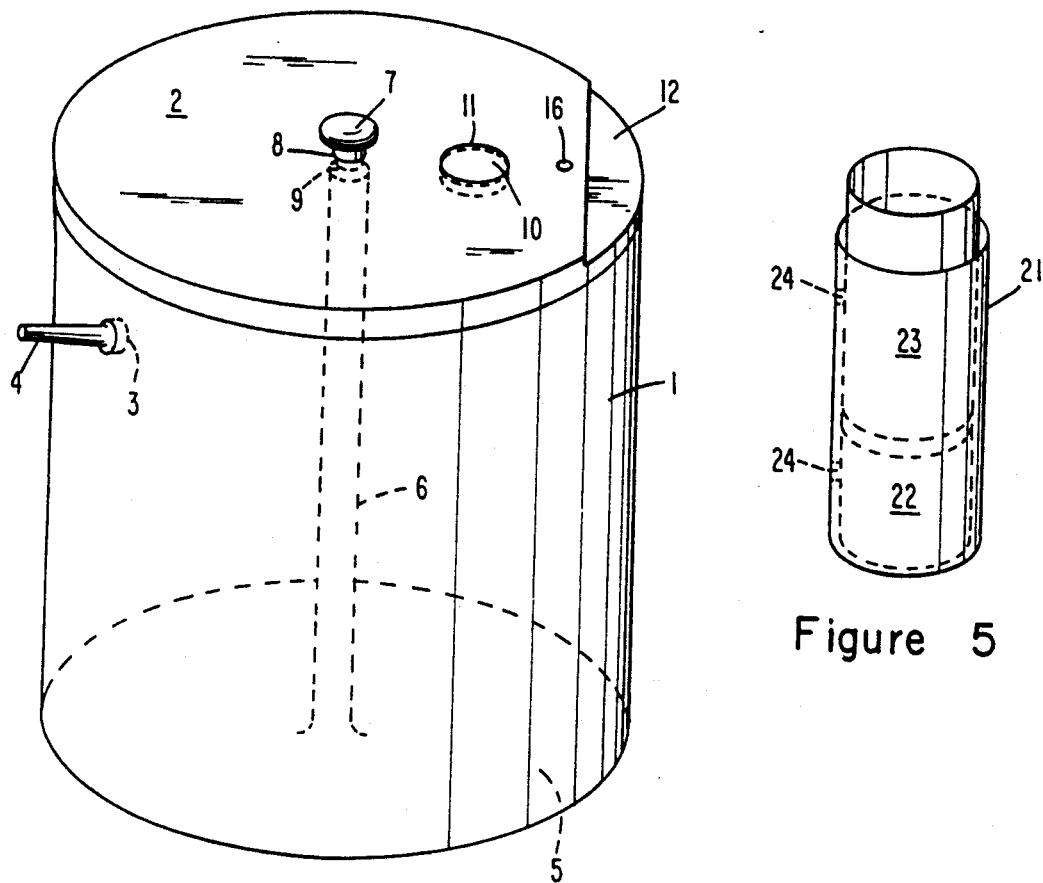
Figure 1
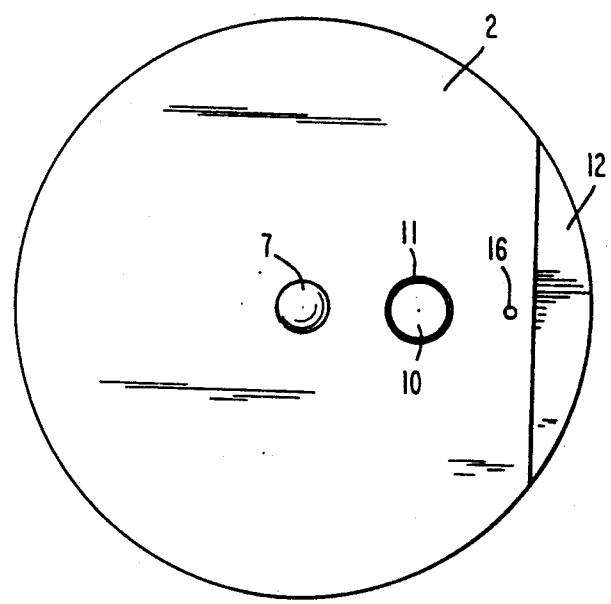
Figure 5
Figure 2

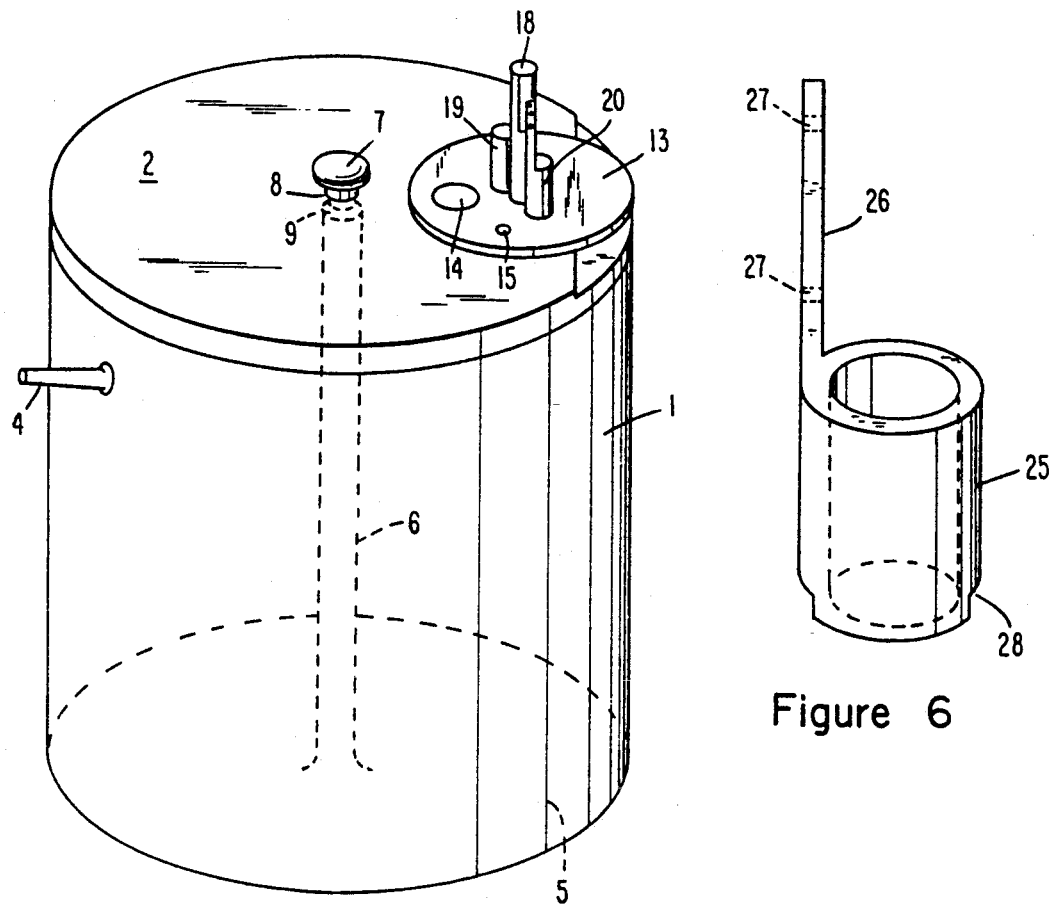
Figure 3
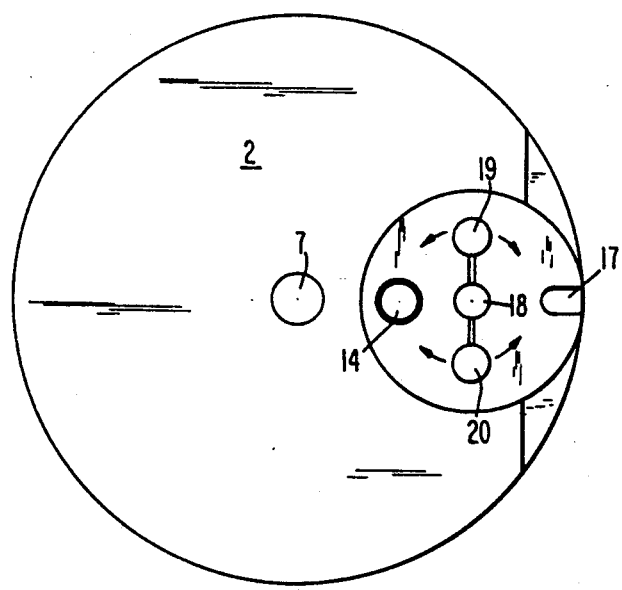
Figure 6
Figure 4

VACUUM FILTRATION APPARATUS

TECHNICAL FIELD

The present invention relates to filtration apparatus and methods. More particularly, the present invention relates to an apparatus for performing vacuum filtration in a semiautomatic mode.

BACKGROUND ART

Filtration is a technique used to remove solid impurities from a liquid or solution, or to collect a solid or adsorbable product from a solution. Two somewhat different kinds of filtration in general use are gravity filtration and vacuum (or suction) filtration.

Gravity filtration relies upon the force of gravity to draw a filtrate though a filter. Vacuum filtration utilizes a vacuum to draw a filtrate through a filter and is therefore quicker than gravity filtration.

Procedures involving both gravity filtration and vacuum filtration are labor intensive because filter elements such as filter papers must be manually positioned beneath or at the bottom of filter wells for each filtration procedure. When a large number of samples are to be filtered, each requires a separate filter element which must be handled by a technician.

The present invention provides for an improved filtration apparatus which automatically dispenses filter elements at a filtration station.

DISCLOSURE OF THE INVENTION

It is one object of the present invention to provide a filtration apparatus which provides for a semiautomatic filtration procedure.

Another object of the present invention is to provide a filtration apparatus which includes means to automatically dispense filter elements at a filtration station.

A further object of the present invention is to provide a filtration apparatus which includes means for easily removing a used filter element from a filtration station.

According to these and further objects of the present invention which will become apparent as the description thereof is presented below, the present invention provides for a filtration apparatus which includes;
  a filtration port;
  means for dispensing filter elements into the filtration port;
  a filtration cup which includes a filtration well and;
  means for supporting the means for dispensing filter elements and the filtration cup, the means for supporting including means for constraining movement, including positioning at the filtration port, of the means for dispensing filter elements and the filtration cup.

BRIEF DESCRIPTION OF DRAWINGS

The present invention will be described with reference to the attached drawings which are given by way of non-limiting examples only, in which:

FIG. 1 is a side perspective view of the filtration chamber according to one embodiment of the present invention.

FIG. 2 is a top view of the filtration chamber depicted in FIG. 1.

FIG. 3 is a side perspective view of the filtration apparatus according to one embodiment of the present invention.

FIG. 4 is a top view of the filtration apparatus depicted in FIG. 3.

FIG. 5 is a perspective view of the means to dispense filter elements according to one embodiment of the present invention.

FIG. 6 is a side view of the filtration cup according to one embodiment of the present invention.

BEST MODE FOR CARRYING OUT THE INVENTION

Figure 8:
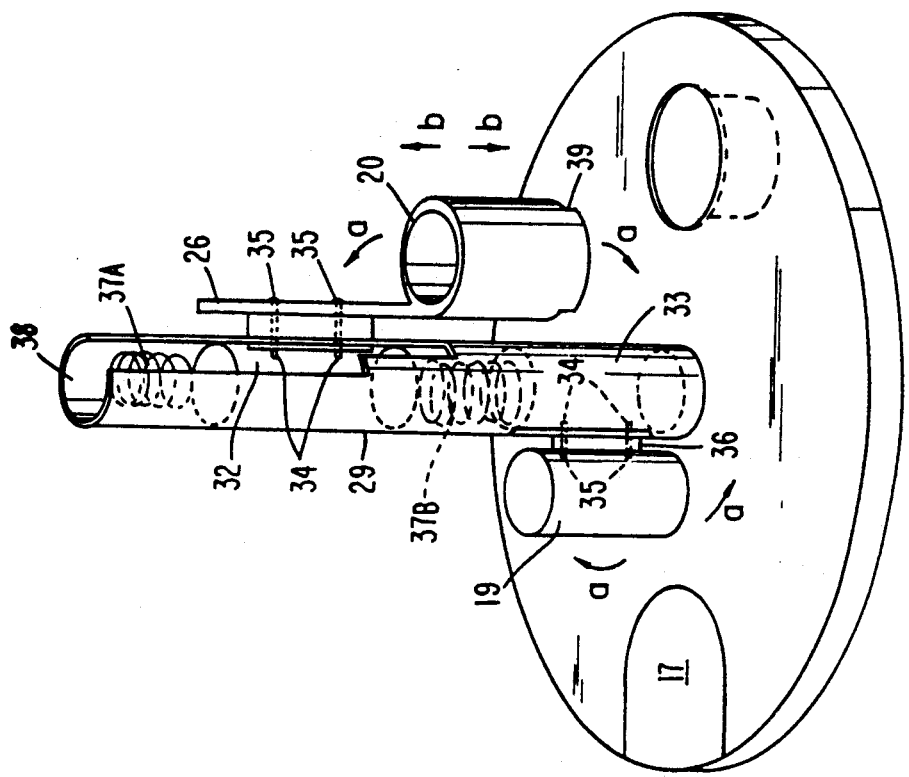
FIG. 8 is a perspective view of the filtration stage according to one embodiment of the present invention depicting the manner in which the means for dispensing filter elements and the filtration cup are attached to the support means.

The present invention relates to a filtration apparatus, and various embodiments or modifications thereof, which allows for conducting filtration procedures in a semiautomatic manner. More specifically, the filtration apparatus of the present invention includes a means for dispensing a filter element from a supply of filter elements to a filtration station at which, subsequent to the dispensing of the filter element, a filtration cup which includes a filtration well is positioned.

The filtration cup is essentially a chamber having an open top and bottom into which a desired solution or suspension may be added during a filtration procedure after the filtration cup is positioned at the filtration station and is seated in the filtration port. The filtration port of the filtration station opens to a chamber to which a vacuum can be applied during a vacuum filtration process. It is to be understood that the chamber need not have a vacuum applied thereto if it is desired to utilize the apparatus for a gravity filtration procedure.

The chamber includes a base and a cover. In a preferred embodiment, the base of the chamber comprises a cylindrical structure having a closed, sealed bottom. The cover, which is designed to be sealingly attached to the base by one or more suitable mechanical fasteners, includes a filtration port or opening therein to which the filtration cup may be brought into a sealing relationship. In the case of vacuum filtration, a vacuum port is provided in the base of the chamber to which a vacuum may be applied. For example, the vacuum port may include a suitable hose connector to which a vacuum hose may be connected to apply a vacuum to the chamber.

The means to dispense filter elements and the filtration cup are mounted on a support means which is attached to a filtration stage which is attached to the cover of the chamber. The means to dispense filter elements and the filtration cup are each mounted to the support means in such a manner so as to be independently positionable over the filtration port in the cover of the chamber. In a preferred embodiment, discussed below, the means to dispense filter elements and the filtration cup are rotatably mounted on a common support member which is attached to and extends from the upper surface of the filtration stage. Moreover, the filtration stage is preferably mounted so as to be tiltable with respect to the cover of the chamber, as discussed below.

In operation, the means to dispense filter elements is manually moved about the support means so as to pass over the filtration port in the filtration stage. The filtration port of the filtration stage and the filtration port of the cover are normally sealingly connected together by a suitable gasket member, e.g., an O-ring. As the means to dispense filter elements is passed over the filtration port of the filtration stage, a filter element is automatically dispensed from the means to dispense filter elements into the filtration port of the filtration stage. The filtration port of the filtration stage includes a means to support the dispensed filter element, e.g. a screen or other porous member.

Once a filter element is dispensed in the filtration port of the filtration stage, the filtration cup is manually moved to be sealingly seated in the filtration port of the filtration stage. After the filtration cup is sealingly positioned in the filtration port of the filtration stage, a desired liquid or suspension can be added into the filtration well of the filtration cup and subjected to filtration through the filter element which was previously dispensed into the filtration port of the filtration stage. In a preferred embodiment which is discussed below, the filtration cup is mounted to a support means on the filtration stage in such a manner so as to be both rotatably movable about the support means and vertically movable with respect to the upper surface of the filtration stage. In this manner, the filtration cup may be rotated to be position over the filtration port of the filtration stage and thereafter move vertically downward to be sealing positioned within the filtration port of the filtration stage.

FIG. 1 is a side perspective view of the filtration chamber according to one embodiment of the present invention. The filtration chamber depicted in FIG. 1 includes a base 1 and a cover 2 and a vacuum port 3 to which a vacuum source (not shown) may be attached by a suitable hose or tube (not shown). In a preferred embodiment, the vacuum port 3 comprises an internally threaded bore into which a conventional hose connector 4 may be attached.

As depicted in FIG. 1, the base 1 may be a cylindrical structure having a sealed or integral bottom 5. However, it is to be understood that the base 1 may be of any desired shape including rectangular, square, etc. The only requirement of the base 1 is that it be sealed when the cover 2 is attached so that a vacuum can be applied thereto when it is desirable to perform vacuum filtration.

The cover 2 has a shape which is complementary to the horizontal cross sectional shape of the base 1. The cover 2 may be sealingly attachable to the base 1 by means of any convenient mechanical fastening means, e.g., clamps, latches, etc, located around the peripheral edge of the cover 2. In a preferred embodiment shown in FIG. 1, the base 1 includes a central shaft 6 which extends upwardly from the bottom 5 thereof. The free end of the shaft may include internal threads into which a manual fastener 7 may be screwed (through a central through-bore 8 in the cover) after the cover 2 is aligned over the base 1. In a similar embodiment, the shaft 6 may have external threads on the free end thereof which extends through a central bore 8 in the cover when the cover 2 is aligned and positioned on the base 1, so that an internally threaded fitting, e.g., wing nut or knurled knob 7, can be use to secure the cover to the base 1. As further shown in FIG. 1, the free end of the central shaft 6 is stepped 9 to provide support for the center of the cover 2. To insure a sealing fit which is suitable to sustain a vacuum, a gasket, e.g., an O-ring, is positioned between cover 2 and base 1 as well as on the stepped surface of shaft 6.

A filtration port 10 is provided in the cover 2. The filtration port comprises a through-bore having an upper stepped lip 11 which can receive a gasket, e.g., an O-ring, to insure a sealing connection between a corresponding filtration port 14 in the filtration stage 13. A portion 12 of the upper surface of the cover 2 radially adjacent the filtration port 10 is stepped as illustrated so as to provide a straight fulcrum edge which allows for a slight tilting of the filtration stage 13 as discussed below.

FIG. 2 is a top view of the filtration chamber of FIG. 1. The relative arrangement of the fastener 7, filtration port 10 and stepped portion 12 of the surface of the cover 2 is best shown in FIG. 2.

FIG. 3 is a side perspective view of the filtration apparatus according to one embodiment of the present invention. In FIG. 3 the filtration stage 13 is attached to the cover 2 so that the filter port 14 in the filtration stage 13 is aligned and in communication with the filtration port 10 in the cover 2. The filtration stage 13 is attached to the cover 2 in such a manner so that the filtration stage 13 may be tilted about a fulcrum. This tilting action is provided by attaching the filtration stage 13 to the cover 2 utilizing a fastening connection which includes a wave spring washer. That is, a wave spring washer well 15 having a stepped through-bore is provided in the lower surface of the filtration stage 13. A corresponding, suitable aligned threaded bore 16 is provided in the upper surface of the cover 2. To allow for tilting of the filtration stage 13, a wave spring washer is position in the wave spring washer well 15 and a fastening means, e.g., bolt, is passed through the wave spring washer and secured into the threaded bore 16 to thereby connect the filtration stage 13 to the cover 2. In this manner, the wave spring washer allows for tilting of the filtration stage 13 with respect to the cover 2 about the fulcrum edge which is provided by stepped portion 12.

In operation, because the area of the stepped portion 12 of the cover 2 is small compared to the area of the cover 2 upon which the filtration stage 13 contacts, and moreover, because the tilt fulcrum is properly located, the filtration stage 13 is normally positioned so that the filtration port 14 of the filtration stage 13 is in sealed connection with the filtration port 10 of the cover 2, e.g., by means of an O-ring positioned with the upper stepped portion 11 of the filtration port 10. When it is desirable to "break" or interrupt the vacuum which is applied to the filtration ports, e.g., to remove a filter element from the filtration port 14 of the filtration stage 13, the filtration stage 13 may be tilted about the fulcrum by an operator pressing down on the portion of the filtration stage 13 which overlies the stepped portion 12 of the cover 2. Such action taken by the operator tilts the filtration stage 13 so that the sealing connection between the filtration ports in the respective filtration stage 13 and cover 2 is opened. Once the connection between the filtration ports is opened, it becomes easier to remove a filter element from the filtration port 14 of the filtration stage. In this manner, it is not necessary for the operator to operate any valve means to interrupt the vacuum applied to the chamber. Moreover, since the vacuum is continuously applied to the chamber, harmful vapors or air born particles are contained and continuously removed from the immediate work area. In order to identify the area on the upper surface of the filtration stage 13 upon which an operator presses to cause tilting of the filtration stage 13, this area may have a particular machined finish or be otherwise marked for identification. FIG. 8 illustrates a stepped portion 17 formed in the filtration stage 13 which coincides with the area on which an operator presses to cause tilting of the filtration stage 13. The principle function of the stepped portion 17 is to provide a recess in which filter element separation disks may be dispensed from the means for dispensing filter elements 19, as discussed below.

The filtration stage 13 includes a central support means 18 which is fixed to and extends from the upper surface of the filtration stage 13. According to one embodiment, the support means 18 has an externally threaded lower end which is receivable in a complementary internally threaded bore in the center of the filtration stage 13. In further embodiments, the support means 18 could be integrally formed or otherwise permanently fixed to the filtration stage 13. Details of the support means 18 are discussed below with reference to FIGS. 7 and 8.

Both a means to dispense filter elements 19 and a filtration cup 20 are supported by the support means 18 in such a manner that each can be rotated about the support means 18. In particular, each of the means to dispense filter elements 19 and the filtration cup 20 are supported in such a manner so that each can be manually moved between an inoperable position and an operable position. In the inoperable position (shown in FIG. 4), the means to dispense filter elements 19 is located in a position which is suitable away from the filtration port 14 so as not to interfere with the operation of the filtration cup 20 when the filtration cup is position over the filtration port 14. For purposes of the present invention, the operable position of the means to dispense filter elements 19 is defined as being directly over the filtration port 14. When moved from the inoperable position to the operable position and back to the inoperable position, a filter element is dispensed through the bottom of the means to dispense filters 19 into the filtration port 14. The dispensed filter element is supported on a support structure, e.g. a screen made from a material which is suitably inert so as not to react with materials being filtered, located in the stepped portion (FIG. 7) of the filtration port 14.

The filtration cup 20 is likewise positionable in an inoperable position (FIG. 4) which is suitable away from the filtration port 14 so as not to interfere with the operation of the means to dispense filter elements 19. In the operable position, the filtration cup 20 is seated in the filtration port 14. Once a filter element has been dispensed in the filtration port 14 and the filtration cup 20 has been moved into the operable position, a desired liquid or suspension to be filtered may be dispensed into the filtration cup 20, and application of a vacuum applied to the chamber 1 will draw the filtrate through the dispensed filter element into the chamber 1.

FIG. 4 is a top view of the filtration apparatus of FIG. 3. The arrows in FIG. 4 show the respective directions in which the means for dispensing filter elements 19 and the filtration cup 20 may be manually rotated about the support means 18.

FIG. 5 is a perspective view of the means to dispense filter elements 19 according to one embodiment of the present invention. The means to dispense filter elements 19 comprises a hollow cylindrical body 21 in which a stack of filter elements 22 is placed. In one embodiment of the present invention, a slot or window may be provided in the cylindrical body 21 to view filter elements thereon. The cylindrical body 21 is supported by the support means 18 so that the when the means for dispensing filter elements 19 is moved from the inoperable position to the operable position, the lowest filter element in the cylindrical body 21 passes across the surface of the filtration stage 13 and drops into the stepped recess in the upper portion of the filtration port 14. As the means for dispensing filter elements 19 is further moved from the operative position to the inoperable position, the lowest filter element which has dropped into the filtration port 14 remains properly seated therein and supported by the above-discussed support structure.

In order to insure that the lowest filter element is properly dispensed, a weighted plug 23 may be placed on the top of the stack of filter elements 22. The plug 23 has an outer diameter which is smaller than the inner diameter of the cylindrical body 21 so that the plug 23 may move freely within the cylindrical body 21. The plug 23 should have a flat bottom to evenly apply pressure to the stack of filter elements. The plug 23 should also be tall enough so as to extend above the top of cylindrical body 21 for easy removal therefrom.

FIG. 5 also shows two bores 24 (optionally threaded) by which the cylindrical body 21 is attached to support means 18 in the manner discussed below.

The filter elements may comprise any commercially available filter elements which are disk-shaped, e.g. paper filter elements. The inner diameter of the cylindrical body 21 should be only slightly larger than the diameter of the filter elements in order to ensure that the filter elements are horizontal when they are dispensed into filtration port 14 and likewise so that any filter element separator disks are horizontal when dispensed into stepped portion or recess 17. This ensures that the dispensed filter elements are properly seated in the filtration port 14 as they are dispensed. In some circumstances, filter elements are supplied with separating disks between adjacent filter elements. It has been discovered that such filter elements with their separating disks may be placed directly into the cylindrical body 21 without removing the separating disks. In use, the separating disks themselves may be dispensed and thereafter removed from the filtration port 14 and discarded. Alternatively, the means for dispensing filter elements 19 may be reciprocally moved over the stepped portion or recess 17 to dispense the separating disks into the stepped portion or recess 17. In this regard, the stepped portion or recess 17 should have a depth equal to or greater than the thickness of the separating disks and less than the thickness of the filter elements.

FIG. 6 is a side view of the filtration cup 20 according to one embodiment of the present invention. The filtration cup 20 comprises a substantially cylindrical body portion 25 which defines a filtration well into which liquids or suspensions to be filtered are dispensed. An arm 26 extends from the top of the body portion 25 of the filtration cup 20. Two bores 27 (optionally threaded) are included in arm 26 for attaching the filtration cup 20 to support means 18, as described below. As depicted in FIG. 6, the bottom of the filtration cup 20 includes a stepped portion which is provided so that an O-ring can be positioned at the bottom of the filtration cup 20 to ensure a sealing connection between the filtration cup 20 and the filtration port 14.

The filtration cup 20 and the filter support structure should be made from a material which is chemically inert to liquids and suspensions which are to be filtered. Suitable materials include plastics, resins, and inert metals such as stainless steels.

Figure 7:
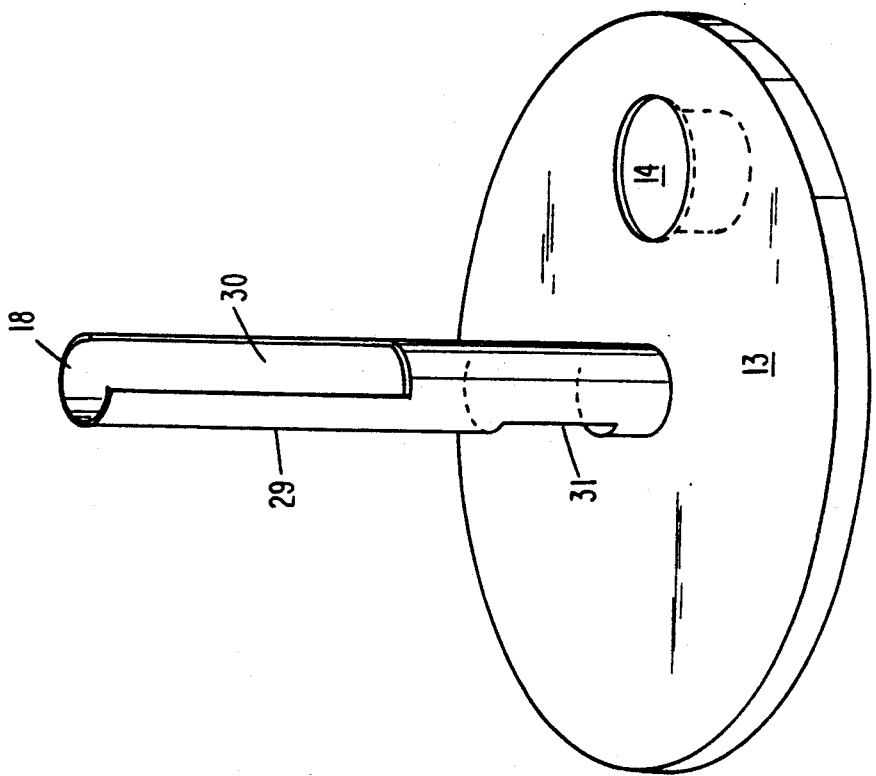
FIG. 7 is a perspective view of the filtration stage and the support means which supports the means to dispense filter elements and the filtration cup according to one embodiment of the present invention.

FIG. 7 is a perspective view of the support means 18 attached to the filtration stage 13. As depicted, the support means 18 includes a tubular structure 29 which includes upper and lower slots 30 and 31 which are formed in the wall of the tubular structure 29. As will be better understood from the discussion below, the slots are circumferentially arranged so that a portion of each slot faces the filtration port 14 of the filtration stage 13. The remaining portions of the slots extend in opposite circumferential directions.

FIG. 8 is a perspective view of the filtration stage according to one embodiment of the present invention depicting the manner in which the means for dispensing filter elements 19 and the filtration cup 20 are supported by the support means 18.

As depicted in FIG. 8, an upper and a lower plug member 32 and 33 are positioned within the central bore of the tubular structure 29. Each plug member has an outer diameter which is sufficiently less than the inner diameter of the tubular structure 29 to ensure that the plug members are free to move within the confines of the tubular structure 29.

Each plug member 32 and 33 includes a pair of internally threaded bores 34 which are spaced apart a distance equal to the corresponding bores 24 and 27 in the respective cylindrical body 21 of the means to dispense filter elements 19 and arm 26 of the filtration cup 20. To support the means to dispense filter elements 19, the bores 24 in the cylindrical body 21 are aligned with the bores 34 in the lower plug member 33 and a suitable fastening means 35, e.g., small bolt or screw, is inserted into the aligned bores to attach the cylindrical body 21 to the lower plug member 33. In order to extend the distance at which the means for dispensing filter elements 19 rotates about the support means 18 and, in order to align the means for dispensing filter elements 19 parallel to the support means 18, a small rectangular spacer 36 is positioned between the cylindrical body 21 and the lower plug member 33.

The filtration cup 20 is attached to the upper plug member 32 in a manner which is similar to the manner in which the means to dispense filter elements 19 is attached to the lower plug member 33. The only significant difference in the manner in which the filtration cup 20 is attached to the upper plug member 32 is that the filtration cup 20 is secured to the upper plug member 32 by means of fastening means 35 which are inserted into the bores 27 in the arm 26 of the filtration cup 20.

Because the upper and lower plug members 32 and 33 are free to rotate within the tubular structure 29, the means for dispensing filter elements 19 and the filtration cup 20 which are attached to the plug members are likewise free to rotate about the support means 18 as indicated by arrows "a" in FIG. 8.

It is noted that the angle of rotation of both the means to dispense filter elements 19 and the filtration cup 20 about the support means 18 is necessarily limited by the width and alignment of the upper and lower slots 30 and 31. Accordingly, it is necessary that a portion of each of the upper and lower slots be circumferentially aligned to face the filtration port 14, so that each of the means to dispense filter elements 19 and the filtration cup 20 can be rotated to be vertically aligned with the filtration port 14. The remaining portions of the upper and lower slots should extend in opposite circumferential directions a sufficient distance so that the means for dispensing filter elements 19 and the filtration cup 20 may be rotated to their respective inoperable positions which are generally illustrated in FIG. 4.

In addition to being rotatable about the support means 18, the filtration cup 20 is designed to be independently movable in a vertical direction. In this regard, a biasing spring 37A is provided within the tubular structure 29 above the upper plug member 32. Such a spring 37A can be retained by a suitable fastening means such as a snap ring or a cap 38 which fits securely in the top of the tubular structure 29. A weaker biasing spring 37B located between the upper and lower plug members helps retain the filter elements and/or separator disks within the means for dispensing filter elements 19 when the means for dispensing filter elements 19 is not over the filtration port 14 by applying spring pressure to maintain the open bottom of the means for dispensing filter elements 19 in contact with the upper surface of the filtration stage 13. The arrows "b" in FIG. 8 shows the manner in which the filtration cup 20 is movable vertically. In a preferred embodiment depicted in FIG. 8, the upper slot 30 has a lower stepped portion which prevents vertical movement of the filtration cup 20 from occurring unless the filtration cup 20 is vertically aligned with the filtration port 14. In FIG. 8 the filtration cup 20 is shown as having an O-ring 39 on the bottom stepped portion 28 thereof.

Although a number of materials can be utilized to fabricate the various elements of the filtration apparatus, the use of plastic or resinous materials for the upper and lower plug members has been found to particularly useful to allow for easy movement of the means to dispense filter elements 19 and the filtration cup.

In operation, a stack of filter elements 22 is placed in the means for dispensing filters 19. Next, or prior to loading the filter elements, a vacuum source is connected to vacuum port 3. To dispense a filter element, the means to dispense filter elements 19 is manually moved from the inoperable position to the operable position and back to the inoperable position. In the case wherein the filter elements are interspersed with separator disks, the dispensing step may need to be repeated if a separator disk is dispensed the first time. If a separator disk is dispensed the first time, it is removed from the filtration port 14 by an operator utilizing tweezers or forceps.

After a filter element has been dispensed in the filtration port 14, the filtration cup 20 is manually lifted up vertically and rotated about the support means 18 to be aligned with the filtration port 14. Once the filtration cup 20 is vertically aligned with the filtration port 14, the filtration cup 20 is lowered vertically into a sealing relationship with the filtration port 14. Once the filtration cup 20 is sealingly received in filtration port 14, any desirable liquid or suspension can be dispensed into the filtration cup 20 and subjected to vacuum filtration (or gravity filtration if no vacuum is applied to chamber 1). After filtration, the filtration cup 20 is lifted from the filtration port 14 and manually rotated back to the inoperable position. Thereafter, the used filter element may be removed from the filtration port 14 by pressing down on the portion 17 of the filtration stage 13 which overlies the stepped portion 12 of the cover 2. This action, as discussed above, causes the filtration stage 13 to tilt and interrupts the sealing connection between the filtration port 10 on the cover 2 and the filtration port 14 on the filtration stage 13. Once the sealing connection between the filtration ports is interrupted, the used filter paper is no longer held by a vacuum force and thus, may be easily removed, e.g., by utilizing tweezers or forceps Although the invention has been described with reference to particular means, materials and embodiments, from the foregoing description, one skilled in the art can ascertain the essential characteristics of the present invention and various changes and modifications may be made to adapt the various usages and conditions without departing from the spirit and scope of the present invention as described in the claims which follow.

What is claimed is:

1. A filtration apparatus which comprises:
   a filtration port;
   means for dispensing filter elements into said filtration port;
   a filtration cup which includes a filtration well and;
   means for supporting said means for dispensing filter elements and said filtration cup, said means for supporting including means for constraining movement, including positioning at said filtration port, of said means for dispensing filter elements and said filtration cup, wherein said means for dispensing filter elements and said filtration cup are each movable between inoperable positions and operable positions wherein said operable positions align the respective means for dispensing filter elements and said filtration cup with said filtration port.

2. A filtration apparatus according to claim 1, wherein said filtration port comprises a pair of aligned filtration ports with one of said filtration ports being provided in a filtration stage and the other of said pair of filtration ports being provided in a cover of a chamber upon which cover the filtration stage is attached.

3. A filtration apparatus according to claim 2, wherein said filtration stage is tiltably attached to said cover.

4. A filtration apparatus according to claim 3, wherein tilting of said filtration stage moves said pair of filtration ports apart from one another.

5. A filtration apparatus according to claim 3, wherein an upper surface portion of said cover is stepped so as to form a gap between said filtration stage and said cover whereby pressure applied between said filtration stage and said cover at said gap causes said filtration stage to tilt.

6. A filtration apparatus according to claim 2, wherein said chamber includes a connection means for applying a vacuum thereto.

7. A filtration apparatus according to claim 2, wherein said filtration cup is movable in a vertical direction with respect to an upper surface of said filtration stage.

8. A filtration apparatus according to claim 2, wherein said chamber includes a central shaft for supporting said cover.

9. A filtration apparatus according to claim 8, wherein said cover is attached to said chamber by a fastening means which is connected to said shaft.

10. A filtration apparatus according to claim 2, wherein said cover and said filtration stage are each circular and said filtration stage has a diameter which is less than half the diameter of said cover.

11. A filtration apparatus according to claim 2, wherein each of said pair of filtration ports includes an upper stepped portion.

12. A filtration apparatus according to claim 1, wherein said means for supporting guiding and orientating comprises a tubular structure which includes an upper and lower slot formed in a wall thereof.

13. A filtration apparatus according to claim 12, wherein said means for supporting includes upper and lower plug members within said tubular structure and said means for dispensing filter elements is attached to said lower plug member and said filtration cup is attached to said upper plug member.

14. A filtration apparatus according to claim 13, wherein said filtration cup includes an arm member by which said filtration cup is attached to said upper plug member.

15. A filtration apparatus according to claim 14, wherein spacers are provided between said means for dispensing filter elements and said lower plug member and between said filtration cup and said upper plug member.

16. A filtration apparatus according to claim 13 wherein a spring is provided above said upper plug member for biasing the position of said filtration cup, wherein a weaker spring is provided between said upper plug member and said lower plug member for biasing the position of said means for dispensing filters.

17. A filtration apparatus according to claim 13, wherein said upper and lower plug member are made from a material selected from the group consisting of plastics and resinous materials.

18. A filtration apparatus according to claim 1 wherein said filtration cup includes a stepped bottom portion.

19. A filtration apparatus according to claim 18, wherein a gasket is attached to the stepped bottom portion of said filtration cup.

* * * * *